United States Patent [19]
Griffiths

[11] Patent Number: 6,014,698
[45] Date of Patent: Jan. 11, 2000

[54] SYSTEM USING FIRST BANNER REQUEST THAT CAN NOT BE BLOCKED FROM REACHING A SERVER FOR ACCURATELY COUNTING DISPLAYS OF BANNERS ON NETWORK TERMINALS

[75] Inventor: Michael John Griffiths, Broomfield, Colo.

[73] Assignee: MatchLogic, Inc., Westminister, Colo.

[21] Appl. No.: 08/872,971

[22] Filed: Jun. 11, 1997

Related U.S. Application Data

[63] Continuation-in-part of application No. 08/858,650, May 19, 1997.

[51] Int. Cl.[7] .................................................. G06F 13/00
[52] U.S. Cl. .......................... 709/224; 709/217; 709/219
[58] Field of Search ........................... 345/428; 709/224, 709/217, 219

[56] References Cited

U.S. PATENT DOCUMENTS

| | | | |
|---|---|---|---|
| 5,247,670 | 9/1993 | Matsunaga | 395/650 |
| 5,289,371 | 2/1994 | Abel et al. | 364/401 |
| 5,341,477 | 8/1994 | Pitkin et al. | 395/200.56 |
| 5,347,632 | 9/1994 | Filepp et al. | 395/200 |
| 5,430,704 | 7/1995 | Rahnema | 270/94.1 |
| 5,442,771 | 8/1995 | Filepp et al. | 395/650 |
| 5,459,837 | 10/1995 | Caccavale | 395/184.01 |
| 5,557,721 | 9/1996 | Fite et al. | 395/148 |
| 5,572,643 | 11/1996 | Judson | 395/793 |
| 5,583,991 | 12/1996 | Chatwani et al. | 395/200.01 |
| 5,598,532 | 1/1997 | Liron | 395/200.01 |
| 5,602,991 | 2/1997 | Berteau | 395/200.01 |
| 5,617,540 | 4/1997 | Civanlar et al. | 395/200.11 |
| 5,621,884 | 4/1997 | Beshears et al. | 395/182.08 |
| 5,628,009 | 5/1997 | Kikuta et al. | 395/610 |
| 5,712,979 | 1/1998 | Graber et al. | 395/200.11 |
| 5,715,453 | 2/1998 | Stewart | 395/615 |
| 5,727,129 | 3/1998 | Barrett et al. | 395/12 |
| 5,742,768 | 4/1998 | Gennaro et al. | 395/200.33 |
| 5,764,235 | 6/1998 | Hunt et al. | 345/428 |
| 5,764,906 | 6/1998 | Edelstein et al. | 395/200.48 |
| 5,774,660 | 6/1998 | Brendel et al. | 395/200.31 |
| 5,781,550 | 7/1998 | Templin et al. | 395/200.48 |
| 5,781,739 | 7/1998 | Bach et al. | 395/200.57 |
| 5,793,972 | 8/1998 | Shane | 395/200.49 |
| 5,794,210 | 8/1998 | Goldhaber et al. | 395/200.48 |
| 5,796,952 | 8/1998 | Davis et al. | 395/200.54 |

OTHER PUBLICATIONS

"Reload, Redraw, Repeat", Paul Boutin, download from electronic webcite address as of May 16, 1997 of: httw://www.packet.com/packet/boutin/97/17/geek,html#1, pp. 1–4.

"Advertisers, Privacy Advocates Clash Over Giving Users More 'Cookie' Control," Angela Drolte, *Electronic Information Policy & Law Report*, 2(21):530–531 (1997).

*Primary Examiner*—Le Hien Luu
*Attorney, Agent, or Firm*—Scott B. Allison; Chrisman Bynum & Johnson

[57] ABSTRACT

A system for delivering information on a computer network and allowing the information to be accessed by terminals connected to the computer network, either directly or through intermediary devices such as local or proxy servers, including computer or web sites storing pages which are requested by terminals for display. The pages may include references for the display of banners. The terminal initiates access or connection to a desired computer or web site to access a desired page. After the desired page is downloaded and served to the terminal from the computer or web site, the terminal initiates and sends an initial banner request signal to an information server. The information server returns a redirect signal to the terminal telling the terminal the location of the desired banner on the computer network, which may be the information server, the computer site, or some other information server, computer site, or location accessible via the computer network. The terminal then initiates a second banner request signal to the location of the desired banner and the banner is downloaded to the terminal for display on the terminal, unless the requested banner has previously been stored or cached in the terminal's memory or in the memory of a local or proxy server connected to the terminal, in which case the second banner request signal is not sent across the computer network and the banner is loaded directly from the terminal's memory or the proxy server.

49 Claims, 4 Drawing Sheets

SYSTEM USING FIRST BANNER REQUEST THAT CAN NOT BE BLOCKED FROM REACHING A SERVER FOR ACCURATELY COUNTING DISPLAYS OF BANNERS ON NETWORK TERMINALS

CROSS-REFERENCE TO RELATED INVENTION

This application is a continuation-in-part of application Ser. No. 08/858,650, filed May 19, 1997, now pending, and entitled Information Storage and Delivery Over A computer Network Using Centralized Intelligence to Monitor and Control the Information Being Delivered.

BACKGROUND OF THE INVENTION

1. Field of the Invention

This invention relates to the system for the storage, management, and delivery of information on a computer network and, more specifically, to the efficient and accurate counting of advertising information displayed on terminals connected to the computer network.

2. Description of the Prior Art

During recent years there have been rapid advancements in computers and computer networking. In particular, the world-wide network of computers commonly referred to as the Internet has seen explosive growth The Internet comprises a vast network of smaller wide area and local area computer networks connected together so as to allow the sharing of resources and to facilitate data communication between computers and users. The rapid growth of the Internet is due, in large part, to the introduction and widespread use of graphical user interfaces called browsers which allow users easy access to network servers and computers connected to the Internet and, more particularly, the World Wide Web.

The World Wide Web forms a subset of the Internet and includes a collection of servers, computers, and other devices. Each server may contain documents formatted as web pages or hypertext documents that are accessible and viewable with a web compliant browser, such as the Netscape Navigator™ browser or the Mosaic™ browser. Each hypertext document or web page may contain references to graphic files or banners that are to be displayed in conjunction with the hypertext document or web page. The files and banners may or may not be stored at the same location as the hypertext document or web page.

A hypertext document often contains hypertext links to other hypertext documents such that the other hypertext documents can be accessed from the first hypertext document by activating the hypertext links. The servers connected to the World Wide Web utilize the Hypertext Transfer Protocol (HTTP) which is widely known protocol which allows users to use browsers to access web pages and the banners or files associated with web pages. The files, banners, hypertext documents, or web pages may contain text, graphics, images, sound, video, etc. and are generally written in a standard page or hypertext document description language known as the Hypertext Markup Language (HTML). The HTML format allows a web page developer to specify the location and presentation of the graphic, textual, sound, etc. on the screen displayed to the user accessing the web page. In addition, the HTML format allows a web page to contain links, such as the hypertext links described above, to other web pages or servers on the Internet. Simply by selecting a link, a user can be transferred to the new web page, which may be located very different geographically or topologically from the original web page.

When using a conventional browser, a user can select which web page or hypertext document the user wishes to have displayed on the user's computer or terminal by specifying the web page's Universal or Uniform Resource Locator (URL) address. Each server has a unique URL address and, in fact, so does each web page and each file needed to display the web page. For example, the URL address for the U.S. Patent and Trademark Office is currently http://www.uspto.gov. When a user types in this URL address into a browser, the user's terminal establishes a connection with the U.S. Patent and Trademark Office and the initial web page for the U.S. Patent and Trademark Office is transmitted from the server storing this web page (which may or may not be actually located at the U.S. Patent and Trademark Office) to the user's terminal and displayed on the user's terminal. The web page may include a number of graphic images or elements, often referred to as banners, which are to be displayed on the user's terminal in conjunction with the web page. Each of the graphic images is typically stored as a separate file on the server and has its own URL address. When the web page is initially transmitted from the server to the user's terminal, the browser receives the URL addresses for the graphic images and then requests that they be transmitted from the server on which they are stored to the user's terminal for display on the user's terminal in conjunction with the web page. The server(s) on which the graphic images are stored may or may not be the same server on which the original web page is stored. More specifically, since the URL's addresses for the included graphic images are all processed separately using the HTML protocols, it is possible and, in fact, common, for these graphic images to be stored on separate and even widely distributed computers or hosts, all of which are accessible to the user's terminal via a computer network. For purposes of the present invention, the term "banner" is meant to be construed very broadly and includes any information displayed in conjunction with a web page wherein the information is not part of the same file as the web page. That is, a banner includes anything that is displayed or used in conjunction with a web page, but which can exist separately from the web page or which can be used in conjunction with many web pages. Banners can include graphics, textual information, video, audio, animation, and links to other computer sites, web sites, web pages, or banners.

The growth of easy access to the World Wide Web and the ability to create visually pleasing web pages have helped increase the amount of advertising and other promotional materials created for use and display with web pages. For example, a car manufacturer may have a web page describing the company and the cars and car parts that the company manufactures and sells. Part of the web page may include advertising information or banners such as, for example, images of current car models sold by the manufacturer or the types and numbers or cars the manufacturer has in stock. The car manufacturer may also contract with the owners or operators of other web pages to have the car manufacturer's advertisement banners displayed when users access these other web pages. Similarly, an advertising agency may contract with various web sites to have the advertisement banners of the agency's clients displayed when users access the web pages stored on the web sites. For example, an advertising agency or ad-network firm may contract with a web site containing general information about cars to have advertising information or banners included on the web pages displayed to a user accessing the web site. The advertising banners may contain graphics, text, etc. about car models or car parts manufactured by on of the advertising agency's clients. Furthermore, the advertisement banners may not be stored on the same server or computer or web site on which the web page is stored. Rather, all or a significant portion of the advertisement banners created by an advertising agency may reside on one or more information or ad servers. Typically, an advertising agency will pay a fixed amount of money for a fixed number of displays of its advertisement banners on a single web page or group of web pages. Therefore, advertising agencies are understandably very interested in knowing which advertisement banners have been displayed with which web pages and how often each advertisement banner has been displayed on terminals or otherwise served to terminals.

Unfortunately, the current state of the art is such that accurate counts are not made of how many times an banner, even a banner containing an advertisement, is displayed to users or served to terminals. Furthermore, nature and extent of the problem of miscounting displays of banners is not well-known or even understood in the industry or by people of ordinary skill in the art. Therefore, despite the well-developed state of the art in the displaying of information, banners, and advertisements in conjunction with web pages, documents, or other information, there is still a need for a system for storing and delivering information and banners on a computer network where accurate counts of the number of times each piece of information and banner is displayed can be made and the information and banners are displayed quickly and efficiently to users or terminals. In addition, there is a need for a highly reliable, even fault-tolerant, system for storing and delivering the information and banners that will not significantly reduce the efficiency of the Internet or the servers on which the information and banners are stored, while providing for accurate monitoring and counting of the information and banners displayed to a user or served to a terminal.

SUMMARY OF THE INVENTION

Accordingly, it is a general object of the present invention to provide a system for storing and delivering information on a computer network.

It is a specific object of the present invention to provide a system for the storage, delivery monitoring, and tailoring of advertising information on a computer network.

It is another general object of the present invention to provide a system for storing and delivering information on a computer network wherein accurate counts of the number of times the information is displayed or served to users or terminals can be made.

It is a specific object of the present invention to provide a system for storing and delivering information on a computer network wherein the operation of the computer network is not significantly affected.

It is another general object of the present invention to provide a system for storing and delivering information on a computer network wherein the system maintains a high degree of reliability and fault tolerance.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, the system includes terminals connected to a computer network, either directly, or indirectly through an intermediary device such as a local or proxy server, that access computer or web sites also connected to the computer network to download or transmit pages, documents, or other information from the computer or web sites for storage or display on the terminals, wherein the pages, documents, or other information served to the terminals contain references to banners to be displayed in conjunction with the pages, documents, and information. The terminal initiates access or connection to a desired computer or web site to access a desired page. After the desired page is transmitted and served to the terminal from the computer or web site, the terminal initiates and sends an initial banner request signal to an information server either requesting that unspecified banner be served to the terminal or that a specified banner be served to the terminal. The information server returns a redirect signal to the terminal telling the terminal the location on the computer network of the banner requested or specified by the terminal or selected by the information server, which location may be the information server, the computer site, or some other information server, computer site, or location accessible to the terminal via the computer network. The terminal then initiates a second specific banner request signal to the location of the banner requested or specified by the terminal or selected by the information server and the banner is transmitted to the terminal for display on the terminal, unless the requested or selected banner has previously been stored or cached in the terminal's memory or in the memory of a local or proxy server connected to the terminal, in which case the second banner request signal is not sent across the computer network and the banner is loaded and/or displayed directly from the terminal's memory or served to the terminal from the proxy server. Each display of a banner on a terminal is counted, preferably by an information server, so that accurate counts of banner displays can be made.

In a second embodiment, a primary information server and at least one mirror information server are connected to the computer site, but may be separated either geographically or network topologically. The banner information stored in the primary information server is also stored in each of the mirror information servers. All of the initial banner request signals are sent to the primary information server which determines which information server is best suited for delivering the banner to the terminal sending the initial banner request signal. As in the first embodiment, the banner may be specifically requested by the terminal or may be selected by the primary information server. The primary information server then sends a signal to the terminal indicating to the terminal which information server the terminal should request the requested or selected banner from. The terminal then generates the second banner request signal to serve or transmit the banner from the information server selected by the primary information server. Should the primary information server go offline, one or more of the mirror information servers can become a new primary information server.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings.

DETAILED DESCRIPTION OF THE PREFERRED EMBODIMENTS

Figure 1:
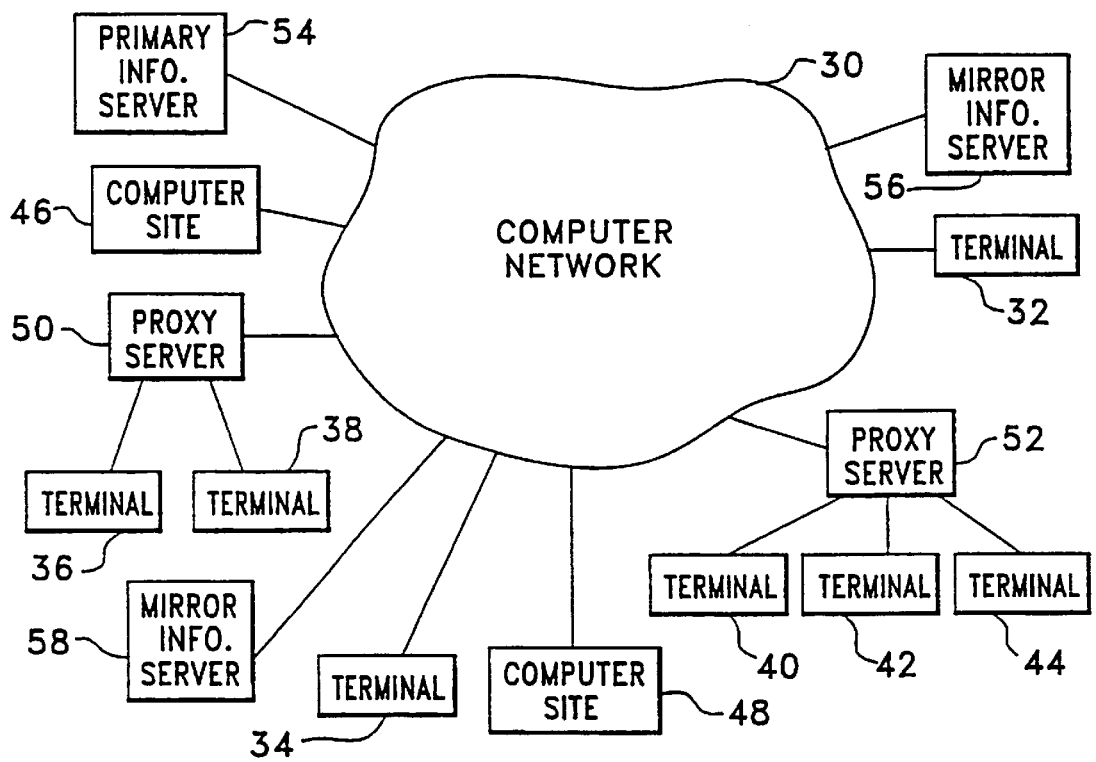
FIG. 1 illustrates a computer network over which the present invention can be implemented.

A representative computer network 30 is illustrated in FIG. 1 and includes computers or terminals 32, 34, 36, 38, 40, 42, 44 with which users can access or connect to the computer network 30 and the resources connected to the computer network 30 such as the computer or web sites or servers 46, 48. The computer network 30 can include satellite links, microwave links, fiber optic transmission lines, local area networks, wide area networks, etc. Terminals, such as the terminals 36, 38, 40, 42, 44, may be connected to the computer network 30 via local or caching proxy servers 50, 52 or other intermediary devices (not shown). Proxy servers allow multiple terminals to access the computer network 30, while reducing the number of physical connections to the computer network 30, as will be discussed in more detail below. A primary information server 54 and mirror information servers 56, 58 may also be connected to the computer network 30 to facilitate the serving and displaying of information or banners to the terminals 32, 34, 36, 38, 40, 42, 44, as will also be discussed in more detail below. The computer network 30 illustrated in FIG. 1 is only meant to be generally representative of computer networks for purposes of elaboration and explanation of the present invention and other devices, networks, etc. may be connected to the computer network 30 without departing from the scope of the present invention. The computer network 30 is also intended to be representative of, and include, the Internet, the World Wide Web, privately or publicly owned or operated networks such as, for example, Tymnet, Telenet, America On-Line, Prodigy, Compuserve, Information America, and the Microsoft Network, and other local or wide area computer networks. The computer network 30 can also include or be representative of corporate or other private intranets, which are privately owned networks using Internet protocols. It should also be noted that the distinction between information servers, web site, computer sites, and generic servers is made only for the purposes of elaboration and explanation of the present invention and that a device can function simultaneously or alternatively as a computer site, web site, information server, generic server, or other device, or combinations thereof without falling outside the scope of the present invention.

By way of general introduction, in a typical computer network, a user located at a terminal can access the resources connected to the computer network. For example, a user at the terminal 34 or terminal 36 can access the web site or computer site 46 and the information stored thereon. The computer site or server 46 may contain web pages, such as the web page 60 illustrated in FIG. 2, that the user can download for display on the terminal 34. For purposes of this invention, the term "web page" shall be defined broadly and will include any hypertext document, information, screen displays, etc. that a user can download or otherwise retrieve from a computer or web site for display and/or storage on the user's terminal, and shall not be limited to only the information, pages, or documents retrievable by a user connected to the World Wide Web. Therefore, the term "web page" will be used generically to refer to information transmitted or served to a terminal from a computer site, web site, server, or other device, wherein the web page may contain banners or references to banners that can be served to the terminal and displayed in conjunction with the web page. The web page 60 may contain textual information, such as "XYZ COMPANY" and "Company History," and information configured in banners, such as the banners 62, 64, 66. The banners 62, 64, 66 may contain graphics, text, video, etc. As will be discussed in more detail below, the banners associated with a web page may not be stored at the same place as the web page and may be downloaded or served to a user's terminal separately from the web page. A significant feature and advantage of the present invention is in the way the banner information is selected and downloaded or served to a user's terminal from computer sites or information servers connected over a same computer network, as will be discussed in more detail below. The current state of the art is such that the counts of banner displays are largely inaccurate, banners are not targetable to large segments of the population using caching proxy servers, and suffers when the performance gains provided by proxy servers are not taken into account in prior art methods of counting banner displays, as will also be discussed in more detail below.

In a conventional web page, such as the web page 60, if a user clicks on, or otherwise activates, the button associated with the textual information, a new web page might be displayed on the user's terminal. For example, if the user clicks on the button 68 associated with the textual information "Company History," a new web page devoted to the history of the XYZ company might be served from the computer site 46 to the user's terminal 34 and displayed on the user's terminal 34. Similarly, if the user clicks on the button 70 associated with the textual information "Product Line," a new web page devoted to the product line of the XYZ company might be served from the computer site 46 to the user's terminal 34 and displayed on the user's terminal 34. Each web page may contain similar "links" to other web pages, hypertext documents, web sites, etc. Activating a link available on a web page or hypertext document, therefore, provides the user with an ability to navigate or move to and display or download different documents, pages, banners, sites, or other information via the computer network 30.

When a user has a web page displayed on the user's terminal, the web page and its associated banners are often stored or cached in the terminal's memory for a period of time. In this fashion, if the user desires or requests that a web page previously displayed to the user on the terminal be reaccessed and displayed on the user's terminal, the web page and the banners associated with the requested web page can be loaded directly from the terminal's memory without reconnecting to the computer or web site on which the web page is stored and from which the web page was originally served and without reconnecting to the computer site or information server on which the banners are stored and from the banners were originally served, thereby reducing the time needed to display the web page. Similarly, if the user's terminal is connected to a local or proxy server, the web page and the banners associated with the web page may be stored in the memory of the proxy server. Should the user at a terminal request a redisplay of a web page previously displayed on the user's terminal or previously displayed on any other terminal connected to the same proxy server, the web page and the banners associated from the web page can be served from the proxy server to the terminal for display on the terminal without connecting to the computer or web site on which the web page is stored and from which the web page was originally downloaded or served and without connecting to computer site or information servers on which the banners are stored and from which the banners were originally transmitted or served. Note that, in the case that the information is retrieved from a copy of the information previously stored held within a proxy server connected to the terminal, the serving of the information to the terminal will typically be completed by sending the information from the proxy server to the terminal, i.e., without the participation of the computer site or server. Therefore, it is difficult for the computer site or server 46 to maintain an accurate count of the terminals 36, 38, etc. on which the information is displayed if the terminals are connected to caching proxy servers, if the performance benefits offered by the caching proxy server are desired.

As previously discussed above, a significant feature and advantage of the present invention is in the way the banner information is selected and transmitted and served to the user's terminal from computer sites or information servers connected over a same computer network. More specifically, the method of the present invention allows banner information to be served over a computer network to a terminal, computer, etc. in a way which takes advantage of the performance enhancements offered by caching proxy servers and such that the operation of the computer network is not significantly affected while providing the ability to accurately track or count the number of times the banner information has been displayed on terminals connected to the computer network, as will be discussed in more detail below. It is not uncommon for banners to contain up to fifty kilobytes (KB) of information, thereby making the limiting of banner transmissions across a computer network very significant to the efficiency and operation of the computer network and to banner serving computer systems.

For purposes of elaboration and explanation of the present invention, the conventions and protocols of the World Wide Web, and browsers therefore, will be used as examples, in particular, the concept of a Uniform Resource Locator (URL), the Hypertext Transfer Protocol (HTTP), the Hypertext Markup Language (HTML), and the Transmission Control Protocol/Internet Protocol (TCP/IP). It should be noted, however, that the concepts underlying the present invention can be used for computer networks using other or different types of conventions and protocols. For more details on these protocols, the reader is directed to: Kevin Washburn and Jim Evans, *TCP/IP running a successful network,* 2nd Ed. (1996), published by Addison-Wesley, Douglas E. Comer, *Internetworking with TCP/IP,* 3rd Ed. (1995), published by Prentice Hall, John December and Mark Ginsberg, *HTML 3.2 and CGI Unleashed Professional Reference Edition* (1996), published by Sams.net Publishing, and Jerry Honeycutt et al., *Using HTML 3.2,* 3rd Ed (1997), published by Que Corporation, all of these references of which are incorporated herein by reference. Other information about the HTTP, HTML, TCP/IP and other network protocols can also be found in U.S. Pat. No. 5,617,540 issued to Civanlar et al., U.S. Pat. No. 5,572,643 issued to Judson, and U.S. Pat. No. 5,442,771 issued to Filepp et al., all of which are also incorporated herein by reference. The linking of one web page or hypertext document to another is commonly done using a hypertext markup comment tag. When the user clicks on or otherwise activates the hypertext markup comment tag, a link to the new web page or hypertext document is generally initiated by the user's browser software which causes the user's terminal to request that the new web page or hypertext document be displayed on the user's terminal or computer. Similarly, if a web page served to a user's terminal contains banners, the URL addresses for the banners will be served with the web page so that the terminal can request that the banners be served to the terminal for display on the terminal along with the previously served web page.

It should also be noted that the disclosed system and method also work for all types of operating systems running on the computers, terminals, computer sites, information servers, and other devices connected to the computer network 30. Such operating systems can include, for example, Microsoft's DOS™, WINDOWS 3.x™, WINDOWS NT™, or WINDOWS 95™ software, IBM's OS/2™ software, Apple's System 7™ software, or the AIX or UNIX operating system software platforms.

Now referring back to FIG. 1, computers or terminals can be connected to the computer network 30 in a variety of ways. For example, the terminals 32, 34 can be connected directly to the computer network 30 or may be attached via a dial-up line or network access service provider. Other terminals may connected to the computer via network proxy or local servers, such as the proxy servers 50, 52. Proxy servers allow multiple computers, terminals, or computer networks to be connected to another computer network at a single point. In addition, since the connection from the terminals 32, 34 and the proxy server 50 to the computer network 30 is in most instances slower than the connections from the terminals 36, 38 to the proxy server 50, the proxy server 50 can provide significant speed improvements. For example, a large corporation may have all its terminals connected via a local area computer network. The local area computer network can be connected to a caching proxy server which is, in turn, connected to the computer network 30. In the computer network 30 illustrated in FIG. 1, the terminals 36, 38 access the computer network 30 through the proxy server 50. Similarly, the terminals 40, 42, 44 access the computer network 30 through the proxy server 52. Using proxy servers allows multiple computers or terminals to access a computer network while limiting the number of physical connections to the computer network. Unfortunately, the use of proxy or network servers also creates some serious problems when the counting of banner information files displayed to users on terminals is desired, as will be discussed in more detail below.

As previously discussed above, the connection of computer sites, web sites, information servers, terminals, and other devices to a computer network allows the resources and information stored in the computer sites, information servers, and other devices to be accessible to users at the different terminals connected to the computer network. The users can also communicate with each other or the computer sites by sending messages or e-mail. When a user accesses the information stored at a computer site, information, web pages, or screen displays are generally served from the computer site for display on the user's terminal or computer. The information transmitted to the user's terminal may contain a banner which is also served from the computer site, or which may be instead automatically served from other computer sites or information servers connected to the computer network. As a general example, referring once again to FIG. 1, suppose a user at the terminal 36 accesses the web site or computer site 46 via the proxy server 50 and the computer network 30 in order to obtain information about the hypothetical XYZ Company. A web page about the XYZ Company, such as the web page 60 illustrated in FIG. 2, may be served from the computer site 46 to the terminal 36 and displayed on the user's terminal 36. The web page 60 may contain places for banner information, such as the banners 62, 64, 66 illustrated in FIG. 2. When the web page 60 is received by the user's terminal 36, the banners 62, 64, 66 may be received at the same time. Alternatively, instructions may be sent to the user's terminal 36 from the computer site 46 telling the terminal 36 where to find and request the banners 62, 64, 66 on the computer network 30, which may be the computer site 46, another computer site, or an information server such as the information servers 54, 56, 58. When such instructions are received by the user's terminal 36, the terminal 36 accesses the appropriate location of banners 62, 64, 66 via the computer network 30 and requests that the banners 62, 64, 66 be served for display on the user's terminal 36.

The process described above in relation to the example has many inherent problems, particularly when it is desired to count the number of times banner information is displayed on the user's terminal. More particularly, with reference to the previous example, the banners 62, 64, 66 displayed on the user's terminal may or may not be related to the XYZ Company. Regardless of the relationship between the banners 62, 64, 66 and the XYZ Company, the XYZ Company, an advertising agency, or some other entity may wish to know how many times the banners 62, 64, 66 have been displayed on users' terminals. As a more specific example, suppose the banners 62, 64, 66 constitute advertisements. The advertiser and the company or client for whom the advertisements are created will be very interested in knowing how many times the advertisements are displayed on users' terminals. Therefore, accurate count information for the banners 62, 64, 66 is highly desirable. Unfortunately, such accurate count information is very difficult to acquire, as will now be discussed in more detail.

Figure 3:
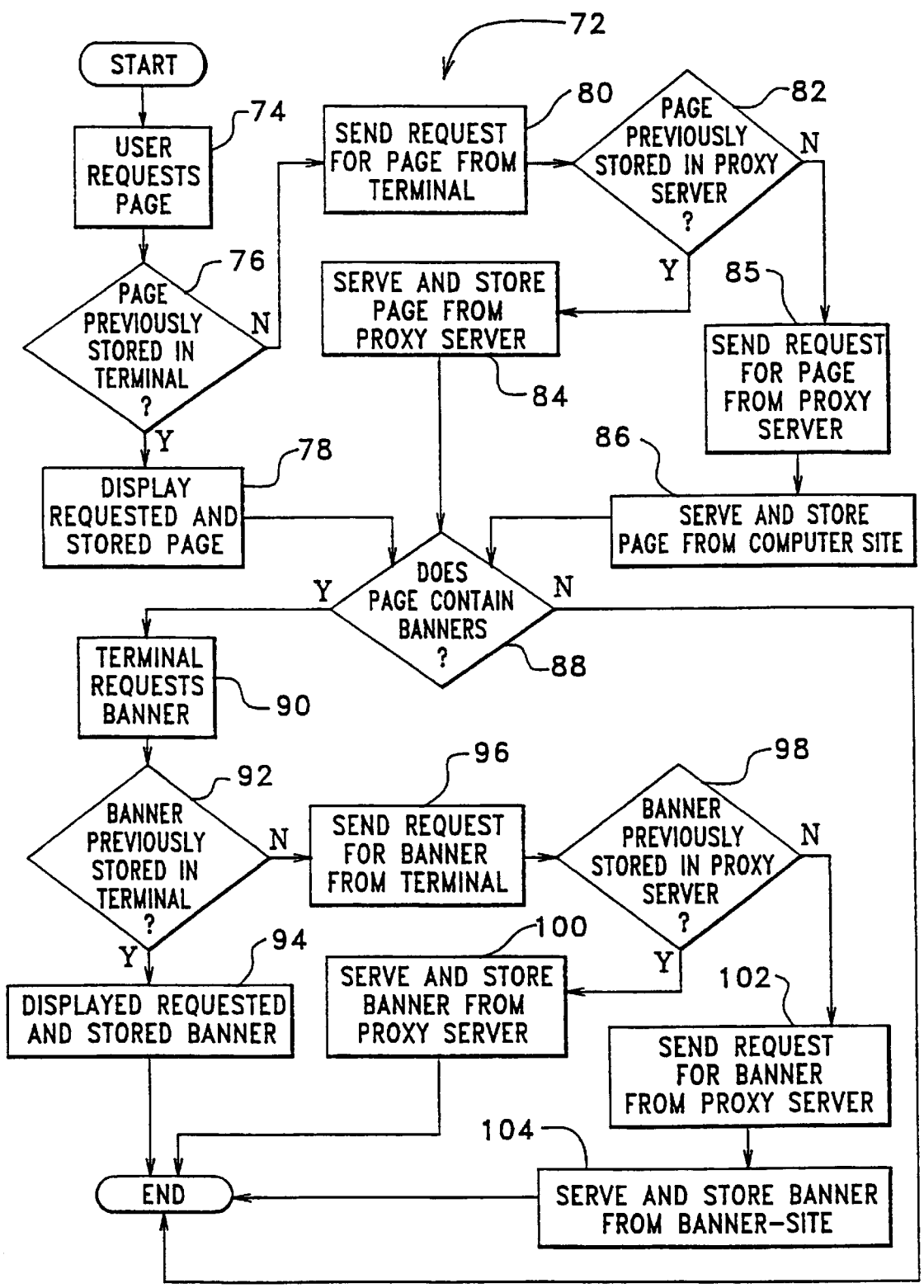
FIG. 3 shows a flowchart diagram of a prior method for storing and delivering information across the computer network of FIG. 1.

Now referring to FIG. 3, a conventional method 72 used to download or serve web pages and banner information to a user's terminal is illustrated. Using the examples discussed above, a user at the terminal 36 can access the computer site 46 via the computer network 30 and request a web page to be served from the computer site 46 to the terminal 36 during the request page step 74. When the user requests a page during the request page step 74, a signal is sent from the user's terminal 36 to the computer site 46 via the proxy server 50 and the computer network 30 telling the computer site 46 which page stored on the computer site 46 the user desires to have displayed on the user's terminal 36. However, the request signal sent by the user's terminal 36 during the request page step 74 may not reach the computer site 46. If the user at the terminal 36 had previously requested the same page from the computer site 46, the page may already be stored in the user's terminal 36. Similarly, if any users at the terminals 36, 38 had requested the same page from the computer site 46, the page may be stored in the proxy server 50. After the user requests a page during the request page step 74, the terminal 36 may determine if the desired page is already stored in the terminal 36 during storage determination step 76. If the desired page is already stored in the terminal 36, the terminal 36 will display the page during display step 78 without sending the signal to the computer site 46. If the desired page is not already stored in the terminal 36, the terminal 36 will send the page request signal during send page request step 80. Since the terminal 36 is connected to the proxy server 50, the page request signal sent during step 80 must pass through the proxy server before reaching the computer network 30. As a result, the proxy server 50 may determine if the desired page is already stored in the proxy server 50 during storage determination step 82 before it sends any signal to the computer site 46 over the computer network 30. If the desired page is already stored in the proxy server 50, the proxy server 50 can stop or otherwise terminate the page request signal, thereby stopping the page request signal from being received by the computer site 46, and the proxy server will serve the desired page directly to the terminal 36 for display on the terminal 36 during serve requested page step 84. The terminal 36 may also store the desired page in its own memory during the serve requested page step 84. If the proxy server 50 does not have the desired page already stored in its own memory, the proxy server 50 will send the page request signal to the computer site 46 over the computer network 30 during send page request step 85. The computer site 46 will then serve the desired page to the proxy server 50 and the terminal 36 for display on the terminal 36 during the serve requested page step 86. Either or both the terminal 36 and the proxy server 50 may store the desired page during the serve requested page step 86.

Since terminals may be connected to the computer network 30 without also being connected to proxy servers, the steps 82, 84, and 85 may not always be necessary in the method 72. For example, now referring to FIG. 1, the terminal 34 is not connected to a proxy server but is connected to the computer network 30. Therefore, the steps 82, 84 in the method 72 are not needed and the terminal 34 will send the page request signal via the computer network 30 directly to the computer site 46 during the send page request signal step 80.

Figure 2:
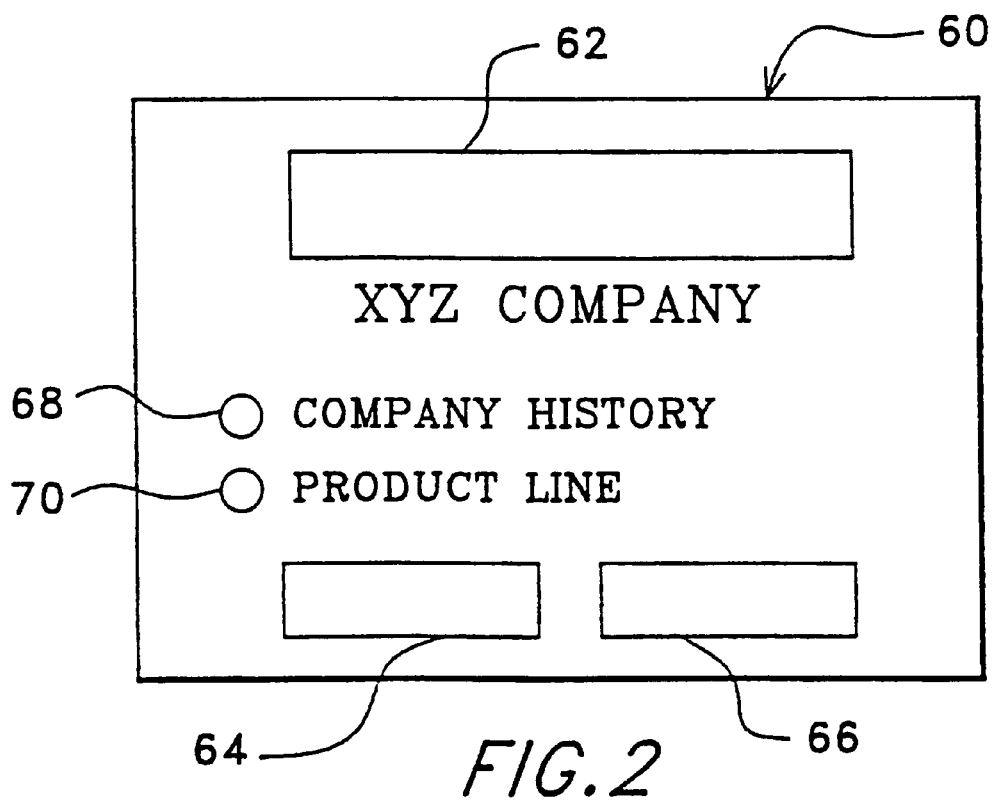
FIG. 2 shows an representative web page accessible from a computer site connected to the computer network of FIG. 1.

The web page requested by the user from the computer site 46 may contain banner information, such as the banners 62, 64, 66 in the web page 60 illustrated in FIG. 2. The banner information may be served with the web page or, more commonly, the banner information may reside in separate files which will need to be requested by the user's terminal 36 before the banner information can be displayed on the user's terminal 36 along with the requested web page. Typically, the web page information served to the terminal 36 for display on the terminal 36 will contain the electronic address information containing the location of the banner information on the computer network 30. The banner information may be located on the computer site 46 or at other locations connected to the computer network 30, as will be discussed in more detail below.

The terminal 36 will determine during banner determination step 88 if the page served to the terminal during steps 78, 84, or 86 contains banner information not already included in the web page displayed on the terminal 36. If the answer is no, i.e., the web page served to the terminal 36 is complete, the process is ended. If the answer is yes, i.e., the page served to the terminal 36 is not complete and contains banner information that needs to be served to the terminal 36, the terminal 36 requests the banner during request banner step 90.

Similar to the process described above for service of the desired page to the terminal 36, the terminal 36 first determines if the requested banner is already stored in the memory of the terminal 36 during banner storage determination step 92. The banner storage determination step 92 can occur in conjunction with the banner request step 90 such that no signal is generated by the terminal 36 if the requested banner is already stored in the terminal 36. If the requested banner is, in fact, already stored in the memory of the terminal 36, the terminal 36 will display the requested banner during display banner step 94 and the process is over. If the requested banner is not already stored in the memory of the terminal 36, the terminal 36 will generate and send a banner request signal during send banner request signal step 96. The request banner signal sent during the step 96 contains the address of the location of the desired banner so the computer network 30 can properly locate the desired banner.

Since the terminal 36 is connected to the proxy server 50, in a similar manner as described above in relation to steps 82, 84, 85, 86, once the proxy server 50 receives the banner request signal from the terminal 36, the proxy server 50 will determine whether or not the desired banner is already stored in the memory of the proxy server 50 during banner storage determination step 98. If the desired banner is already stored in the memory of the proxy server 50, the proxy server 50 will transmit and serve the banner directly to the terminal 36 for display by the terminal 36 during serve banner step 100. The terminal 36 may also store the banner in its own memory during the serve banner step 100. If the requested banner is not already stored in the proxy server 50, the proxy server will send the banner request signal to the device on which the requested banner is stored via the computer network 30 during the send banner request signal step 102. The device on which the requested banner is stored will then download or serve the requested banner to the proxy server 50 and the terminal 36 during the serve banner step 104 for display by the terminal 36. Either or both the terminal 36 and the proxy server 50 may store the banner served by the device on which the requested banner is stored during the serve banner step 104.

The steps 98, 100, and 102 will not be necessary if a terminal requesting the banner information is not connected to a proxy server. For example discussed above, since the terminal 34 is not connected to a proxy server, the steps 98, 100, and 102 are not needed for the terminal 34 and the terminal 34 will send the page request signal via the computer network 30 directly to the server on which the requested banner is stored during send banner request signal step 102.

When the computer site 46 in the example described above in relation to FIG. 3 is a web site using the HTTP and HTML protocols, the user selects and accesses the web site 46 by entering the Uniform Resource Locator (URL) address of the web site 46 into the terminal 36. The page request signal generated by the terminal 36 during step 74 tells the computer network 30 and the equipment associated with the computer network 30 which computer site the user wishes to access. Each computer and device attached to the computer network 30 will have its own unique URL address and each page and file stored in each computer will usually also have its own URL address so that each page and file can be made accessible to users via the computer network 30. For example, if the user desires to access the web page 60 for the XYZ company, the user may enter the URL address for the web page 60, http://www.xyzcompany.com, into the browser software operating on the user's terminal. The URL address contains an alphanumeric portion or domain name, "www.xyzcompany.com" that identifies the web site in an easy to understand and remember format. Each computer or web site and other host devices, end systems, networks, or network router devices connected to the computer network 30, however, has a unique Internet Protocol (IP) address that is thirty-two bits in length and is generally written as four decimal numbers in the range zero (0) through 255, separated by periods. For example, an IP address could be 128.10.2.30 which in its full thirty-two bit format is 10000000.00001010.00000010.00011110. Providing every host computer on a computer network with a unique IP address allows any host computer to communicate with any other host computer.

By a process known as domain name resolution or by the use of Domain Name System (DNS), the IP address of the computer or web site on which XYZ Company's web page 60 and the web page 60 are stored can be determined from the domain name provided in the URL address. In fact, the IP address for computer or web site must first be determined when an URL address is entered by the user at a terminal that does not contain the IP address. For example, if a user at a terminal or computer enters the alphanumeric domain name address, i.e., http://www.xyzcompany.com, the alphanumeric domain name must be resolved by the Domain Name System to a specific IP address, i.e., http://019.247.56.38, before the designated and desired computer containing the web page 60 for the XYZ Company can be accessed. If the user enters the specific IP address directly, then use and access of the Domain Name System is not required. If resolution or determination of an IP address is required, the name server will return the appropriate IP address to the terminal which generated the signal in which the IP address was not included. The use and operation of domain name resolution and the Domain Name System for determining IP addresses are well known to people of ordinary skill in this art and need not be explained in any further detail for purposes of the present invention.

When the web page requested by the user during page request step 74 is served to the terminal 36 during steps 78, 84, or 86, the web page will often contain the URL addresses of banners or banner information to be displayed along with the web page on the user's terminal 36 instead of the banner information itself. The terminal 36 will then use the URL addresses of the desired banner information to access the computer network 30 and request that the desired banner information be served to the terminal 36 for display on the terminal 36. For example, when the web page 60 for the XYZ company is served to a terminal, the web page may contain URL addresses for the banners 62, 64, 66. The URL address for the banner 62 may be of the form http://www.bannersite1.com/banner1.gif. The "bannersite1.com" portion of the URL address for the banner 62 indicates which device, for example the information server 54, connected to the computer network contains the requested banner 62 where the "banner1.gif" portion of the URL address for the banner 62 indicates which file stored on the indicated device constitutes the banner 62. Similarly, the URL address for the banner 64 may be of the form http://www.bannersite2.com/banner54.gif. The "bannersite2.com" portion of the URL address for the banner 64 indicates which device, for example the information server 56, connected to the computer network contains the requested banner 64 where the "banner54.gif" portion of the URL address for the banner 64 indicates which file stored on the indicated device constitutes the banner 64. As shown by these examples, the banner 62 may not be stored on the same device as the banner 64. In addition, as previously discussed above, the banners 62, 64 may be located on the same web site as the requested page or may be located on other web or computer sites, such as the computer or web site 48 shown in FIG. 1, or on information servers, such as the information servers 54, 56, 58 shown in FIG. 1. When the terminal 36 requests the banner information during step 96, the banner request signal will contain the URL addresses for each banner to be displayed with the web page so that the banners can be located at, and served from, the appropriate devices on the computer network 30.

The prior are method 72 discussed above and illustrated in FIG. 3 has many inherent problems, however, which make it unsuitable for counting the number of times a banner is displayed on the terminals connected to the computer network 30, as will now be discussed in more detail. Since the web page, and the banners to be displayed with the web page, selected by the user can be stored in either the user's terminal or the proxy server connected to the user's terminal, not all requests for the banner information are forwarded by the user's terminal or respective proxy server and transmitted over the computer network 30. While this result may appear to be beneficial in that the amount of data traffic on the computer network 30 is reduced, in fact, this result prevents the accurate count of banner displays. More specifically, entities such as advertising agencies, advertising repping firms, and the entities hiring them want to count and know each time a banner is displayed on a user's terminal so that the success or failure of various advertising banners can be determined and so that the correct payment for the display of the advertising banners can be computed. There are two conventional ways in which the number of times a banner is displayed is counted. The first way is to count the number of times an information server or computer site serves a page during the step 86. The second way is to count the number of times that the information server actually serves a banner during the step 104. Unfortunately, a page requested by a terminal during the step 74 is already stored on either the terminal or a proxy server connected to the terminal, the display of the banner on the user's terminal is not counted under the first method. Similarly, if a banner requested by a terminal during the step 90 is already stored on either the terminal or a proxy server connected to the terminal, the display of the banner on the user's terminal is not counted under the second method. The discrepancy between the number of times a banner is actually displayed on a user's terminal and the number of times the display of the banner on the user's terminal is counted can become significant, even reaching error rates of eighty percent or higher.

One solution to the problem is to prevent banner information from being stored or cached on either the user's terminal or the proxy server to which the user's terminal is attached. Therefore, each time a banner is requested by the user's terminal, the banner will have to be downloaded or served from the computer site or information server on which the banner is stored to the user's terminal for display on the user's terminal. For example, the HTTP and HTML protocols allow banners to be tagged or indicated as being uncacheable or unstorable at the user's terminal or the proxy server connected to the user's terminal, as will be discussed in more detail below. Therefore, such a solution can be implemented where after each request for banner information, the requested banner information is served from the location storing the banner information, thereby allowing the display of the banner information to be counted accurately at the location at which the requested banner information is stored.

The solution described in the preceding paragraph creates a significant problem, however, that creates even more significant consequences, thereby making its use for accurately counting advertisement and banner displays highly impractical and undesirable. More specifically, the storage of web pages and banner information at the user's terminal or in the proxy server connected to the user's terminal provides several important benefits that will be eliminated by this simple solution. First, the speed at which the information is displayed on the user's terminal will be reduced since the information will always have to be transmitted or served to the user's terminal for display on the user's terminal each time the user requests the information. If the information had previously been requested by the user such that the information was already stored in the user's terminal or the proxy server connected to the user's terminal, or if the information had previously been requested by a second user at a terminal connected to the same proxy server as the first user's terminal such that information was already stored in the proxy server connected to the first user's terminal, re-requesting the information to be downloaded or served from another device connected to the computer network and the actual serving of the information to the user's terminal will take substantially longer than loading the information already stored in the user's terminal or serving the information to the user's terminal only from the proxy server to which the user's terminal is connected. If the banners contain advertisements, the length of time the banner is displayed to the user may also be critically important to the advertiser. The user may not wait for the banner information to be served and displayed before the user selects another web page, thereby minimizing the success of the banner.

A second and more serious problem created by having to serve the information displayed on the user's terminal each time the information is requested is that the amount of data traffic on the computer network will significantly increase, and can even bring the flow of information to a virtual stop, particularly if all requests for banner information from any terminal connected to the computer network require the information to be transmitted across the computer network to the terminal.

A third problem created with the prior art method 72 is that the step 100 eliminates any possibility of targeting specific information to be displayed with specific web pages. That is, if any demographic or other information about the user or terminal 36 is known by the server on which the banners are stored, the prior art method 72 prevents the server from using the demographic or other information to target the user with a specific banner or to tailor a banner to the specific user. Such targeting or tailoring of banners can be very important when the banners contain advertising information and the advertisers want to send specific advertisement banners to users about whom specific demographic or other information is known.

The method 110 of the present invention solves the initial problem of how to create accurate counts of banner information displays on user terminals while avoiding the problems created by requiring the banner information to be retransmitted across the computer network each time the banner information is requested by a user or a user's terminal, as will now be discussed in more detail in reference to FIG. 4. In addition, the method 110 allows for the use of content general and content specific signals, which allow banner displays to be targeted to specific users while taking advantage of the performance gains possible with caching proxy servers, as will also now be discussed in more detail in reference to FIG. 4.

In the method 110, the steps 74, 80, 82, 84, 85, 86, and 88 are essentially the same as described above in relation to the prior art method 72 illustrated in FIG. 3. Therefore, no further discussion of these steps is required for purposes of explanation of the method 110 of the present invention. After a requested page containing a banner has been displayed on a user's terminal during the steps 78, 84, or 86, and, as determined during banner determination step 88, if the page contains banners to be displayed on the user's terminal 36 along with the page, an initial request banner signal is generated by the user's terminal 36 during initial banner request step 112. Unlike the previous situation with the method 72, however, the terminal 36 and the proxy server 50 preferably do not check to see if the banner information has already been stored and the terminal 36 and the proxy server 50 preferably cannot stop the initial banner request signal sent by the terminal 36 during the step 112 from being transmitted across the computer network 30. That is, the initial banner request signal sent by the terminal 36 during the step 112 is preferably a mandatory signal to be transmitted across the computer network 30 and that cannot be blocked or terminated by either the terminal 36 or the proxy server 50, even if the banner to be served to the terminal 36 is already stored in either the terminal 36 or the proxy server 50.

The initial banner request signal generated by the terminal 36 during the step 112 preferably does not contain the location information of the desired banner as does the banner request signal generated by the terminal 36 during the request banner step 90 of the prior art method 72. In other words, the initial banner request signal generated by terminal 36 during the step 112 can be a content general signal and may contain only the minimum amount of information needed to tell a designated computer site, information server, or other device which receives the initial banner request signal and on which a banner may or may not be stored or located, only that the terminal 36 desires that an unspecified banner be served to the terminal. The designated computer site, information server, or other device can then select which banner is to be served to the terminal 36. The process of selecting which banner is to be served to the terminal 36 can be made during the optional banner selection step 113, which would occur after the step 112 and before the step 114 in the method 110 illustrated in FIG. 4. If the optional selection step 113 is not used with the method 110, the terminal 36 will request during the step 112 that a specific banner to be served to the terminal 36. If the optional selection step 113 is used with the method 110, the terminal 36 will only request during step 112 that a banner be served to the terminal 36, but the terminal 36 will not specify which banner is to be served to the terminal 36.

Since the designated computer site, information server, or other device should, barring any problems with the computer network 30, always receive the initial request banner signal from the terminal 36 sent during the step 112, the display of the banner on the user's terminal 36 can always be counted and monitored. Instead of returning or serving a banner to the terminal 36, however, the designated computer site, information server, or other device will usually return or send a banner location signal to the terminal 36 during return banner location address step 114 specifying the location address of the banner requested by the terminal 36 (if the optional step 113 is not used) or the banner selected by the designated computer site, information server, or other device (if the optional step 113 is used), to be served to the terminal 36. The signals transmitted during the steps 112 and 114 are very short or small since the signals contain only a small amount of information, particularly when compared to a banner which may contain a large amount of information.

Similar to the process described above for service of the desired page to the terminal 36 during step 76, the terminal 36 first determines if the requested (if the optional step 113 is not used) or the selected (if the optional step 113 is used) banner is already stored in the memory of the terminal 36 during banner storage determination step 92. If the requested or selected banner is, in fact, already stored in the memory of the terminal 36, the terminal 36 will display the banner during display banner step 94 and the process is over. If the requested or selected banner is not already stored in the memory of the terminal 36, the terminal 36 will generate and send a second banner request signal during send second banner request signal step 116. The second banner request signal sent during the step 116 is essentially the same as the signal sent during the step 96 of the method 72 and, therefore, contains the address of the location of the requested or selected banner so the computer network 30 can properly locate the requested or selected banner.

Since the terminal 36 is connected to the proxy server 50, in a similar manner as described above in relation to steps 82, 84, 86, once the proxy server 50 receives the second banner request signal from the terminal 36, the proxy server 50 will determine whether or not the selected banner is already stored in the memory of the proxy server 50 during banner storage determination step 98. If the selected banner is already stored in the memory of the proxy server 50, the proxy server 50 will transmit the banner directly to the terminal 36 for display by the terminal 36 during serve banner step 100. The terminal 36 may also store the banner in its own memory during the serve banner step 100. If the requested or selected banner is not already stored in the proxy server 50, the proxy server will send the second banner request signal to the location of the banner on the computer network 30 during the send second banner request signal step 118 in a similar manner to the send banner request signal step 102 in the method 72. The device on which the requested or selected banner is stored will then download and serve the banner to the proxy server 50 and the terminal 36 during the serve banner step 104 for display by the terminal 36. Either or both the terminal 36 and the proxy server 50 may store the banner served by the computer site 50 during the serve banner step 104.

When the computer site 46 in the example described above in relation to FIG. 4 is a web site using the HTTP and the HTML protocols, as previously described above, the user selects and accesses the web site 46 by entering the Uniform Resource Locator (URL) address of the desired web site 46 into the terminal 36. The page request signal generated by the terminal 36 during page request step 74 tells the computer network 30 which computer or web site the user wishes to access. As previously discussed above, when the requested page is served to the terminal 36 from the web site 46, it may contain the URL addresses of specific banners to be displayed along with the requested web page, or it may contain the URL addresses in a content general format, i.e., the URL address does not specify exactly which banner is to be served to the terminal 36, only that a banner is to be served to the terminal 36. It should be noted that steps 80, 85, 112, 116, and 118 may also include name resolution of the IP address needed to transmit the signals across the computer network to the designated and desired computer web site or information server and these steps should be construed to include such IP address resolution and the use of the Domain Name System (DNS).

Again using the example of the XYZ Company and the web page 60, the web page 60 served to the terminal 36 or loaded by the terminal 36 during steps 78, 84, or 86 may include general content URL addresses for banners or specific content URL addresses for the specific banners 62, 64, 66. A general content URL address for a banner does not provide the necessary information to determine which banner is to be displayed. Rather a general content URL address for a banner only indicates that a banner is to be displayed and the receiver of the signal generated by the terminal 36 during the step 112 can decide which banner is to be displayed during the selection step 113. A general content URL address for a banner could be of the form http://www.bannersite1.com/image;spacedesc=contentsitename. A server at www.bannersite1.com looks to see if the first word after the name of the site is "image" or any other previously designated word which can be distinguished from an existing file name. It the first word after the name of the site is "image," then the URL address is recognized as a generic request or content general request for a banner, which, as a result, does not specify any particular banner. The server than looks for a space descriptor immediately following the text "spacedesc=" which provides a reference to a section of the server in which banners are stored or located and from where a specific banner can be selected to be served to the terminal 36. The space descriptor field in the general content URL address can reference different groups of banners such as, for example, a collection of car advertisements, a collection of detergent advertisements, etc., depending on the web page providing the general content URL address.

A specific content URL address for a banner does contain the necessary information to determine which banner is to be displayed and the location for the banner. As illustrated in the examples above, the specific content URL address for the banner 62 may be of the form http://www.bannersite1.com/banner1.gif. The "bannersite1.com" portion of the specific content URL address for the banner 62 indicates which device, for example the information server 54, connected to the computer network contains the banner 62 and the "banner1.gif" portion of the specific content URL address for the banner 62 indicates which file stored on the indicated device constitutes the banner 62 and the physical location of the file.

Preferably, the initial banner request signal generated by the terminal 36 during the step 112 is a general content URL address that merely requests a banner to be displayed on the terminal 36, but does not specify which banner is to be displayed. The recipient of the initial banner request signal can then select which banner is to be displayed on the terminal 36 during the selection step 113, thereby allowing targeting and variation in the banners displayed, and return a specific content URL address to the terminal 36 during the step 114 in the form of a Status HTTP 302 Redirect (temporary) signal to the terminal 36 to tell the terminal 36 where the selected banner to be displayed on the user's terminal 36 is located on the computer network 30, i.e., to provide the terminal 36 with the content specific URL address of the selected banner to be displayed on the user's terminal 36. An HTTP 302 temporary redirect signal does not create an association between the general content URL address signal generated by the terminal 36 during the step 112 and the banner to be displayed on the terminal 36 or the response signal sent to the terminal 36 during the step 114. Therefore, even though the banner displayed on the user's terminal 36 may be cached or stored on the user's terminal 36 or on the proxy server 50, the response sent during the step 114 to the general content URL address signal generated by the terminal 36 during the step 112 is not cached. Therefore, the signal sent by the terminal 36 during the step 112 will not be blocked or otherwise prevented from being transmitted over the computer network 30 by either the terminal 36 or the proxy server 50.

An alternative to using only the HTTP 302 Redirect signal is to use, in addition, standard HTML response header tags. More specifically, every time a server responds to a request for a document or page from a client's browser software, the response from the server can contain one or more response header lines. Each line of the response header describes a different aspect of the response, including its size, the type of content it is (image, text, etc.), a status code, and one or more tags which affect the changing nature of the document and how proxy servers or terminals should deal with the document.

The method 110 of the present invention can use HTML tags to tell proxy servers and terminals that the response sent during the step 114 is not cachable, even if the actual banner eventually served to the terminal is itself cachable. There are many types of tags that can be used for this purpose. For example, the Expiry tag which specifies the date and time beyond which a cached copy of the response is no longer valid. By setting the Expiry tag to a date in the past, the response sent to the terminal 36 during the step 114 will not be considered valid for any further signals sent by the terminal during later steps 112. Therefore, the response sent to the terminal 36 during a previous step 114 is no longer valid and the signal sent by the terminal 36 during the current step 112 cannot be blocked by the terminal 36 or the proxy server 50. Another tag that could be used is the Last-Modified Tag which specifies the last time the response was modified. By setting the Last-Modified Tag for a response as a date far in the past, the terminal or proxy server may consider the response to be too "stale" to be considered valid. A third tag that could be used is the Cache-Control Tags or the obsolete pragma:no-cache tag which informs a receiver of the response that the response is not be cached or stored in the receiver.

Another option for implementing the method 110 of the present invention using standard HTML and HTTP protocols is to incorporate variable components into the links on a web page or hypertext document such that the variable components are incorporated into the general content URL addresses sent by the terminal during the step 112. For example, referring to the web page 60 in FIG. 2, the hypertext links or URL addresses returned for the banners 62, 64, 66 when the web page 60 is displayed on the user's terminal 36 during steps 78, 84, or 86 can contain a variable component such as, for example, a random number, a time/date stamp, cgi-bin string, or a random page identifier. In this manner, each time the web page 60 is displayed on the terminal 36, the URL addresses for the needed banners 62, 64, 66 will be different. When the terminal 36 sends the initial banner request signal during step 112, the initial banner request signal can incorporate the variable component URL addresses generated when the web page 60 is served or displayed on the terminal 36. Since the variable component URL addresses are, by definition, different every time, the initial banner request signal generated during the step 112 will be different every time, thereby preventing the terminal 36 or the proxy server 50 from blocking the transmission to the computer network 30 of the initial banner request signal generated during the step 112.

Another alternative for implementing the method 110 of the present invention is to use for the general content URL address, an URL address which, though constant, is interpreted by caching proxy servers and/or caching web browsers or terminals to resemble a constantly changing URL address and, as a result, is not cached. More specifically, caching proxy servers exist which will specifically avoid caching content related to any URL address containing the strings "cgi-bin" and "?" which are strings conventionally used in the construction of URL addresses for which responses are dynamically generated and, therefore, are unsuitable for caching. It should be noted that a general content URL address using this techniques such as, for example, http://www.bannersite1.com/cgi-bin/image; spacedisc=contensitename?variable, need not use the cgi-bin directory and need not use the variable after the "?". Since these markers exist in the URL address, some caching proxy servers will be led to conclude that the URL address should not be cached.

In order to speed up the process of downloading, transmitting, or serving a specific banner from an information server to the terminal 56, the content specific URL address of the requested or selected banner sent to the terminal during step 114 can contain the exact Internet Protocol (IP) address of the requested or selected banner. For example, instead of providing the specific content URL address for the banner 62 as http://www.bannersite1.com/banner1.gif, the specific content URL address for the banner 62 could be provided as, for example, http://236.45.78.190/banner1.gif, thereby removing any need to use the Domain Name System (DNS) to convert the alphanumeric address "www.bannersite1.com" of the information server to its exact IP address. The use of content general and content specific URL addresses and IP addressing is well known to people of ordinary skill in the art and need not be explained in any further detail for purposes of the present invention.

When the method 110 is to be used specifically to count the number of times a banner is displayed on a terminal, it has been determined that the best mode for practicing the method 110 is achieved by including or incorporating a HTTP 302 redirect signal in the signal sent to the terminal 36 during the step 114 and including or incorporating "cgi-bin" and "?" strings in the signal sent from the terminal 36 during the step 112. Some software browsers used on a terminal, particularly the browsers currently developed and marketed by the Microsoft Corporation, can block or terminate the signal generated by a terminal during the step 112 if the banner desired by the terminal is already stored on the terminal, even if an HTTP 302 redirect signal was used during a previous step 114 prior to the banner being stored on the terminal, such that the terminal does not transmit or send the signal during the step 112. In such cases, the banner is displayed directly on the terminal 36 in much the same way as during the step 78 in the prior art method 72 previously discussed above.

As a result of the blocking of the signal created by the terminal during the step 112 by the terminal 112, the display of the banner on the terminal is not, and cannot, be counted by other devices, such as an information server or ad server, connected to the computer network which would normally receive the signal sent by the terminal during the step 112 and could count the display of the banner on the terminal. As a result of standard HTML and HTTP protocols, the use of "cgi-bin" and "?" strings in the signal sent by the terminal during the step 112 prevents the terminal from blocking the signal sent during the step 112. Therefore, by using a combination of the HTTP 302 redirect signal during the step 114 and the "cgi-bin" and "?" strings during the step 112, an accurate count of the displays of a banner on a terminal will be made.

The method 110 of the present invention has particular application to the advertising industry, as will now be discussed in more detail. While the previous discussions in regard to the prior art method 72 and the method 110 of the present invention have indicated that the banner information can be located on either the computer or web sites connected to a computer network or information servers connected to the computer network, the conventional practice in the advertising business is to have all of the banners located on one or more information or ad servers, such as the information servers 54, 56, 58. As previously discussed above, advertising agencies create the banners and then arrange or contract to have the banners be associated with web pages or web sites such that when users access the web sites and the web pages are displayed on the user's terminal, the banners are also displayed on the user's terminal. While the advertisements can be stored on the computer or web sites connected to the computer network, it is typically more convenient for the advertisements to be centrally stored on an information or ad server, particularly if the advertisements change or the advertisers want to target specific advertising banners to specific users. Therefore, when a web page requested by the user is served to the user's terminal and the web page contains advertising banners, the web page will often include the address information for the advertising banner to be displayed in conjunction with the requested web page so that the terminal can request the serving of the advertising banners. By keeping the advertising banners centrally located in an information server, the advertiser can keep each advertising banner's address information included in the web page constant while changing the actual advertising banner associated with the banner address information. In addition, the generation of content general URL addresses during the step 112, the selection of banners to be displayed by a central or primary information server during optional step 113, and the return of content specific URL addresses during the step 114 allow the advertiser to rotate and change the advertising banners displayed to users. Furthermore, if the device receiving the initial banner request signal generated by a user's terminal during step 112 has any demographic or other information about the user, the use of content general URL addresses and content specific URL addresses in the method 110 allows the device sending the banner location signal during step 114 to select an advertising banner targeted to the particular user during the step 113, thereby increasing the appeal and success of the advertising banner. In contrast, the prior art method 72 previously discussed above does not utilize content specific and content general URL addressing. Nor does the prior art method allow for the selection or targeting of banners to be made by an information server.

The prior art method 72 also does not allow each display of the banners associated with a page to be counted, while the method 110 of the present invention specifically allows for each such display of a banner to be counted and monitored. More specifically, allowing the user's terminal or proxy server connected to the user's terminal to terminate or block a banner request from the user's terminal (created during step 90) when the banner is already stored in either the user's terminal or the proxy server connected to the user's terminal in the prior art method 72 prevents accurate banner display counts to be made. In contrast, the method 110 of the present invention specifically allows each banner display to be counted by preventing the user's terminal or the proxy server connected to the user's terminal from terminating or blocking the initial banner request signal (created during step 112) from reaching the information or ad server in which the desired banner is stored or which is controlling the selection of the banner to be served to the terminal.

In addition to the advantage of the method 110 described above, a significant feature of the method 110 of the present invention is that it does not significantly impact the operation or efficiency of the computer network 30. While the initial banner request signal created by the terminal during the step 112 and the banner location signal generated during the step 114 are additional signals created in the method 110 that are not created in the prior art method 72, thereby creating additional data traffic and overhead on the computer network 30, the initial banner request signal and the banner location signal are both extremely small, often comprising no more than a single packet or one-hundred to two-hundred bytes. Therefore, the overhead created by the additional banner signal during the step 112 and the banner location signal during step 114 is negligible. More importantly, since the method 110 still allows the web pages and the banner information to be cached or stored in the terminals and proxy servers, there is no unnecessary retransmission of the web pages or banners from the computer or web sites or the information or ad servers to the terminals which would significantly increase the data traffic and overhead on the computer network 30.

In a second embodiment of the method 110 of the present invention, multiple information servers storing the banner information used in conjunction with the displays of web pages on user terminals are connected to the computer network. Using mirror information servers allows for banners to be distributed faster to user terminals and increases the reliability of the method 110. For example, the computer network 30 illustrated in FIG. 1 includes a primary information server 54 and mirror information servers 56, 58 which preferably contain a duplicate of the banners stored on the primary information server 54. When the terminal 36 creates and sends the initial banner request signal during the step 112, the initial banner request signal is preferably configured so that it sent to and received by the primary ad or information server 54 which in turn creates and sends the address location information of a selected banner to the terminal 36 during the step 114. The selected banner is preferably stored at the primary information server 54 and at also the mirror servers 56, 58. The address location information for the banner sent by the primary information server 54 to the terminal during the step 114 is preferably includes the address location for the banner at the information server best suited to handle a transmittal of the banner to the terminal 36 or includes other information with which the terminal 36 can determine the best suited information server to serve the banner. Typically, the information server best suited to handle the serving or transmittal of a banner to the terminal 36 will be the information server that can download or serve the banner to the terminal 36 in the shortest period of time. Other selection criteria can be used, however, in determining which information server is best suited to download or serve a banner to a terminal, including the network topological distance between the terminal 36 and the information servers, the geographical distance between the terminal 36 and the information servers, the bandwidth of the information servers, or the round trip times for a message between the terminal 36 and the information servers. The use of a primary information server and mirror information servers allows all of the intelligence, databases, banner display counting processes, etc. for operating the method 110 of the present invention to be stored and operated in a single location, i.e., the primary information server, while allowing mirror information servers to be little more than network accessible memory devices or servers on which the banners are stored. Many Internet Service Providers (ISPs) and other network service providers connected to computer networks will provide memory space and will store documents and other files for access and retrieval from the computer network for relatively low cost and such storage capabilities are easy to implement and maintain.

As a further example, suppose that the user at the terminal 36 sends an initial banner request signal to the primary information server 54 during the step 112 and the primary information server selects a banner to be served to the during step 113. If desired, the primary information server 54 can update the count information for the particular banner selected to be displayed on the user's terminal 36. The primary information server 54 may determine that the mirror information server 56 is best suited for serving the selected banner to the terminal 36 since the mirror information server 56 can serve the selected banner to the terminal 36 in the shortest period of time. Alternatively, the primary information server 54 may determine that either it, the mirror information server 58, or some other information server (not shown) connected to the computer network 30 can serve the selected banner to the terminal 36 in the shortest period of time. The information servers 54, 56, 58 may themselves be separated geographically or topologically such that every terminal connected to the computer network 30 has an optimal information server from which banners can be served, even if the terminals are scattered across a wide geographical or topological area. Therefore, for example, the terminal 36 may be optimally served by the mirror information server 56 while the terminal 32 may be optimally served by the primary information server 54 and the terminal 44 is optimally served by the mirror information server 58. When the primary information server 54 has determined which information server is best suited to handle the serving of the selected banner to the terminal 36, the primary information server 54 will return the banner location address for the selected banner at the selected information server to the terminal 36 during the return banner location address step 114. The terminal 36 can then request that the selected banner be served from the selected information server during the steps 98, 100, 104, 116, and 118 for display at the terminal 36.

As previously discussed above, the selection of which mirror information server is the best suited for serving a particular banner to a particular terminal can be made a variety of ways. The criteria to be considered can include precision, i.e., the accuracy of the determination of which information server is best suited to serve a particular banner to a particular terminal, the ease of implementation, and the time required for the primary information server to make the determination of which information server is best suited to serve a particular banner to a particular terminal. The decision can be made by either the primary information server or by some other method.

As one example implementation of the decision criteria implemented in a primary information server, a table or matrix can be stored and maintained at the primary information server 54 which showing the relationship between each information server 54, 56, 58 and the particular terminal. The matrix preferably contains the round trip times for messages sent back and forth between each information server and the terminal. The information in the matrix can be updated continuously or periodically as desired. This information server determination method has several advantages. First, with such a matrix stored at the primary information server, the primary information server can quickly and accurately determine which information server is best suited to serve a particular banner to a particular terminal. Also, the time for the primary information server to make a decision is very fast and does not require additional searches of the computer network 30. Furthermore, the primary information server will know exactly which information server served each and every banner to every terminal on the computer network, which can be very valuable for evaluating the efficiency of the method 110.

This information server determination method described above does, however, also have several disadvantages. First, a significant effort is needed to generate the matrix and the information stored in the matrix, particularly if the computer network is quite large. More specifically, this method requires that monitoring software and/or hardware be operating at each information server to measure the round trip times between the information servers and the terminals. In addition, the matrix at the primary information server will need to be updated with the information created by the monitoring software and hardware at the mirror information servers so that accuracy of the matrix is maintained. Since the computer network may be continuously changing or evolving as new devices and networks are connected or disconnected from the computer network, and portions of the computer network may become temporarily disabled or offline, the overhead of monitoring the round trip times can be significant. The ability to create a matrix with the round trip times between all of the information servers and all of the terminals may take too long to develop, particularly if there is a significant number of terminals that do not ever request a banner stored on the information servers. This problem can be reduced by assuming that the round trip time between an information server and a particular terminal is the same, or at least approximately the same as, for example, other terminals connected to the same proxy server, the same as other terminals connected to the same sub-network, or the same as other terminals in a /24 network (a set of 256 contiguous IP addresses).

Another method in which the information server is best suited for serving a particular banner to a particular server uses and takes advantage of the Domain Name System (DNS) already being implemented on the Internet. As previously discussed above, DNS is a system for resolving or determining the thirty-two bit Internet Protocol (IP) addresses for each host computer or network device on the computer network. Every time a signal is generated by terminal or other device connected to the computer network requesting access to, or communication with, another device on the computer network, the IP address for the desired device must be determined if the signal does not already contain the IP address.

The DNS process is very complex and so a complete description of it is beyond the purview necessary for a complete understanding of the present invention. In addition, the DNS process is well known to people of ordinary skill in this art. For purposes of a general explanation of how the DNS process can be used for selection of the information server to serve a banner to a particular terminal, the DNS process uses name servers or resolvers located in the computer network to determine the IP addresses. The name servers maintain listings of each computer or device in the computer network and their IP addresses. If a particular name server does not know a specific IP address when it is queried for the IP address, the name server can forward the query to another name server. Once the correct IP address is determined, it is passed along the reverse path to the terminal and is stored on all name servers who received the query and forwarded the query along.

With the present invention, each information server 54, 56, 58 operates a name server. Furthermore, each name server is configured to respond to a DNS request with the IP address of the information server containing the name server. When the banner location signal is returned to the terminal 36 during the step 114 from the primary information server 54, the banner location signal contains a reference or general URL address of the banner to be served to the terminal, but not the specific IP address. The terminal 36 then initiates a DNS name resolving process prior to step 116 to determine the information server from which to serve the desired banner. Upon receiving the name resolving request from the terminal 36 or its nearby DNS name server, over the course of several transactions, each of the name server in each information servers returns an IP address to the terminal containing the IP address of the information server in which the name server is located. That is, name server in the information server 56 returns the IP address of the information server 56, while the name server in the information server 58 returns the IP address of the information server 58, etc. All of the IP addresses becomes stored in the DNS name server closest topologically to the terminal 36 since that DNS name server would have been the first name server to receive the name resolution request from the terminal 36. The DNS name server keeps a list of all of the IP addresses for all of the information servers and the round trip times for communications between the DNS name server and the name servers located at the information servers. The round trip times are initially set to zero. When the DNS name server gets a request from the terminal 36, it selects the information server having the shortest round trip time and provides the terminal 36 with the IP address of the selected information server. Since initially all of the round trip times are set to zero (0), the DNS server will randomly select one IP address and return it to the terminal 36. The DNS name server will then monitor the round trip time between DNS server and the information server and update DNS name server's round trip time list for the particular information server's IP address returned to the terminal 36. The next time the terminal 36 requests name resolution from the DNS server, the DNS name server will return the IP address of a different information server since the round trip time of the first information server will no longer be zero (0). After this process is implemented at least as many times for each terminal or each specified group or domain of terminals as there are information servers, the best information server for serving banners to the terminals or groups or domains of terminals will be determined and the appropriate IP addresses will be returned to the terminal requesting the DNS process. The standard DNS process includes ways for insuring that the route trip times are updated so that particular terminals are not locked into always receiving banners from particular information servers if other information servers become better suited for serving banners to the particular terminals.

This second information server determination method described above has several advantages. Unlike the first method described above, this method takes advantage of the already existing DNS process and requires no special monitoring or sniffing software or hardware to be installed at the information servers. Also the second method does not require a matrix to be generated and stored in the primary information server or updates to a matrix to be made. In comparison, the operation of a name server at each mirror site is simple to implement and operate. Therefore, in contrast to the first method, the second method is easy and relatively inexpensive to implement. Unfortunately, in contrast to the first method, the second system may be less precise and take longer to implement since a DNS search or rotation process will have to be implemented each time a banner is to be served to a terminal. In addition, until the round trip times for each information server are determined, the second method may produce less than optimal results. Furthermore, updating of the round trip time information may require using an information server other than the optimal information server to serve a particular banner to a particular terminal. Finally, the shortest round trip time between the DNS name server and the name servers at the information servers may not be an accurate reflection of the round trip times between the terminal and the information servers, particularly if a given user's DNS name server is topologically distant from the terminal. As a result, the information server selected by the DNS name server may not always have the shortest round trip time to the terminal.

Other methods for determining which information server is best suited to serve a particular banner to a particular terminal include looking at the information, if any, about the terminal received in the initial banner request signal generated during step 112. The information might include things such as the country code or the network code in which or on which the terminal resides. In addition, the information might include information about how the initial banner request signal was routed from the terminal to the primary information server, thereby giving an indication of the topological location of the terminal in the computer network. The primary information server can then use this information dynamically or in conjunction with a matrix look-up process to determine which information server to select to serve the selected banner to the terminal requesting a banner.

Another important benefit of mirroring is that it allows for redundancy and back-up if one or more of the information servers connected to the computer network 30 goes offline or becomes otherwise inaccessible or incapable of serving banners to terminals. For example, in the preferred method, the initial banner request signal is preferably sent by a terminal to the primary information server 54 during the send initial banner request signal step 112, thereby allowing the primary information server 54 to be the centralized source of intelligence and the centralized source of banner display monitoring and counting. If however, the primary information server 54 becomes disabled or goes offline for any reason, one of the mirror information servers 56, 58 can temporarily or permanently become the primary information server for the computer network 30, thereby allowing the delivery of banners to terminals to continue. Preferably, the switch from the disabled primary information server 54 to the back-up information server 56 or 58 can take place very quickly such that little impact on the delivery of banner information is noticed or even created. It should be noted, however, that the backup primary information server will need to contain all of the centralized intelligence, databases, banner counting and monitoring software, etc. operating on the original primary information server 54 such that the backup primary information server can operate appropriately if the original primary information server 54 becomes disabled or goes offline.

The switch over to the backup primary server can be handled in a variety a ways. For example, once again taking advantage of the Domain Name System (DNS) process and Internet Protocol (IP) addresses, both the primary information server and the backup information server will operate a name resolver or name server such that when the initial banner request signal is generated during the step 112 that does not contain the needed IP address, the IP address for the primary information server is returned to the terminal 36 and stored in all name servers receiving and processing the query for the IP address of the primary server. The backup information server will monitor the primary information server and, in the event that the primary information server goes offline or becomes otherwise disabled, the backup information server will shut down or disable the name server at the primary information server. Furthermore, the backup information server will begin returning its IP address instead of the IP address of the primary information server when queries are received. All IP address information stored in name servers has a time-to-live (TTL) value that is set by the name server returning the IP address. When the TTL value expires, the IP address information is no longer stored in the name server and the name server will have to forward any requests it receives for the IP address. Therefore, when either of the name servers in the primary information server or the backup information server returns an IP address for the primary information server, the IP address is set to have a finite TTL value of, for example ten to thirty minutes. In the event of the primary information server going offline, eventually the IP addresses for the primary information server stored in the name servers will expire and queries for the IP address will reach the name server in the backup information server which will then return its IP address instead of the IP address of the primary information server. Thus, within a finite time and selected TTL, all name servers in the computer network that have stored or cached the IP address of the primary information server will have their caches or memory cleared. They will then ask for new addresses and receive the IP addresses of the backup information server in response.

The use of a centralized primary information server along with at least one mirror information server on a computer network provides significant advantages for the delivery of banners containing advertising information to a terminal for display on the terminal. First, advertising banners are in most cases going to be delivered to the terminal requesting the advertising banner in quick and efficient manner since the information server best suited for delivering and serving a banner to a terminal will in most cases be the information server selected by the primary information server to deliver the banner to the terminal. The faster the advertising banner is delivered to a terminal, the more likely the user at the terminal is to look at the advertising banner, particularly if the advertising banner is displayed on the user's terminal for a longer period of time before the user exits the web page or selects a new page. In addition, mirroring of information servers allows for the relatively fault tolerant delivery of advertising banners to users at the terminals, thereby reducing or even eliminating lost opportunities to display advertising banners on terminals when the primary information server becomes disabled or otherwise goes offline. Furthermore, centralizing the intelligence at a primary information or ad server allows the displays of advertising banners to be continuously and accurately monitored, thereby increasing the ability to judge the success or failure of specific advertising banners.

The foregoing description is considered as illustrative only of the principles of the invention. Furthermore, since numerous modifications and changes will readily occur to those skilled in the art, it is not desired to limit the invention to the exact construction and process shown and described above. Accordingly, all suitable modifications and equivalents may be resorted to falling within the scope of the invention as defined by the claims which follow. For example, while the method 110 of the present invention is directed primarily to the accurate counting of banner information displayed with web pages, the method 110 can also be used to provide an accurate count of the number of times specific web pages are displayed on a user's terminal by creating a send initial page request signal step in a similar manner to the send initial banner request step 112 and a return page address location step in a similar manner to the return banner location step 114 prior to the storage determination step 76. In addition, while the method 110 of the present invention has been described with connections to the computer network 30 being made primarily by terminals, computers, and proxy servers, it should be appreciated that the method 110 will also be suitable for use with other devices connected between the user's terminal and the computer network may exist which can cache or store the web pages or the banner information.

As yet another example of how the method 110 can be modified, if a primary information server receiving the initial banner request signal generated by a terminal during step 112 determines that the primary information server itself is the information server best suited for downloading or serving a selected banner to the terminal, the primary information server may, instead of sending a banner location signal to the terminal during the step 114, simply transmit the selected banner to the terminal directly, thereby eliminating some of the steps in the method 110.

Figure 4:
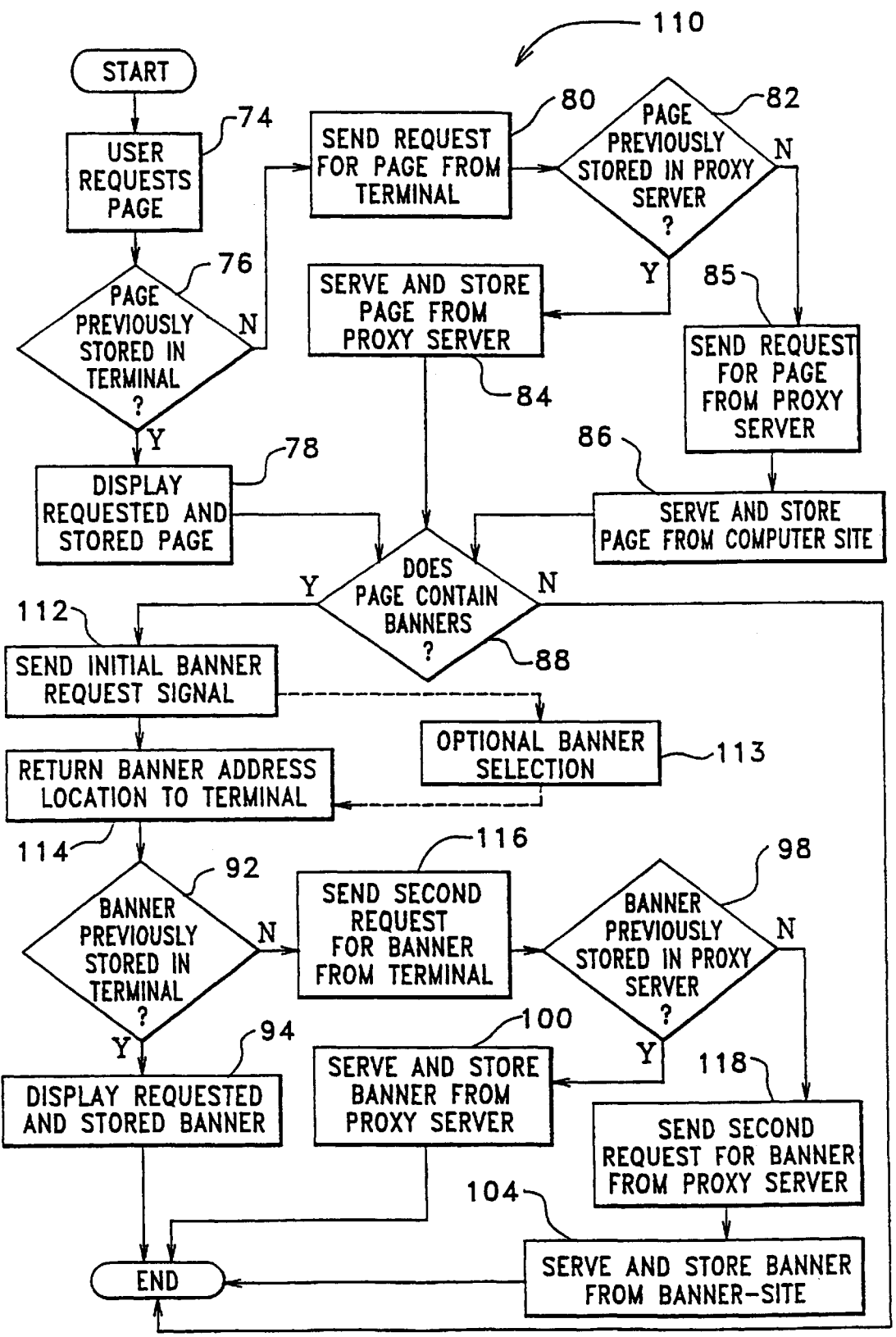
FIG. 4 shows a flowchart diagram of the preferred method of the present invention for storing and delivering information across the computer network of FIG. 1.

As yet another example of how the method 110 of the present invention can be modified, it is possible to move the steps 112 and 114 to between the steps 92 and 116 in FIG. 4 so that the steps 112 and 114 are no longer performed after step 88 and before step 92. The steps 112 and 114 are instead implemented after the step 92 and before the step 116 if the answer in step 92 is "no". In this embodiment, web pages and banners that are stored in a user's terminal are automatically reloaded and displayed on the user's terminal without generating additional signals on the computer network. Therefore, if a user "backs" through a page, i.e., the user moves through a series of pages, each of which are displayed on the user's terminal and stored in the terminal's memory along with the page's associated banners, and then decides to review or redisplay some of the pages (such as by using the "back" function of the browser software operating on the user's terminal), no initial banner request signal is generated during the step 112 since the steps 88, 92, 94 will be followed in sequence. While this embodiment of the method 110 of the present invention does not allow the redisplay of the banners on the same terminal (and presumably to the same user) to be counted or monitored, it still allows the redisplay of banners stored in the proxy server, but which are requested to be displayed on different terminals (and presumably to different users), to be counted and monitored.

While the method 110 of the present invention has been discussed in detail primarily with the counting, monitoring, and targeting of advertising or other content over computer networks, the method 110 can also be used for the counting, monitoring, or targeting of content or banners over local area networks, e-mail networks, and non-computer networks such as switched-network cable television. In addition, the method 110 can easily be implement to monitor levels of content sophistication, content language, content type, content levels of summarization, etc. when different content options are selectable by a user or terminal.

It should also be noted that, while the terms information server, computer site, web site, server, media property have been used to describe the method 110 of the present invention, the terms have been used only to help clarify different portions of the method 110. Thus, an information server could also function as a computer site, a computer site could also function as an information server, and both could be labeled generically as servers. The method 110 of the present invention, therefore, should not be limited by the terminology used to describe different aspects of the present invention.

The embodiments of the invention in which an exclusive property or privilege is claimed are defined as follows:

1. A method for delivering information to a terminal connected to a computer network, wherein information delivered over the computer network from a primary server to the terminal contains references to other information to be delivered to the terminal from the primary server or from one or more other servers connected to the computer network, comprising:

serving a first portion of information to the terminal, wherein said first portion of information contains a reference to a second portion of information;

sending a first request signal from the terminal to the primary server requesting a location address for said second portion of information from which said second portion of information can be served to the terminal, wherein said first request signal cannot be blocked from reaching said primary server by either the terminal or any intermediary device located topologically between the terminal and the primary server as a result of previous caching or storing of said first portion of information or said second portion of information by the terminal or said intermediary device;

sending a location signal from the primary server to the terminal providing said location address of said second portion of information; and determining if said second portion of information is already stored on the terminal and, if said second portion of information is not already stored on the terminal, sending a second request signal from the terminal containing said location address of said second portion of information and requesting that said second portion of information be served to the terminal for display on the terminal, and, if said second portion of information is already stored on the terminal, displaying said second portion of information on the terminal.

2. The method of claim 1, including counting each time said second portion of information is displayed on the terminal.

3. The method of claim 2, wherein said counting each time said second portion of information is displayed on the terminal is performed by the primary server after said primary server receives said first request signal from the terminal.

4. The method of claim 2, wherein said content general request signal includes the string's "cgi-bin" and "?".

5. The method of claim 1, including serving said second portion of information to the terminal if said second portion of information is not already stored on the terminal and updating a counter of displays of said second portion of information on the terminal.

6. The method of claim 1, wherein said first request signal is a content general request signal.

7. The method of claim 6, wherein said second request signal is a content specific request signal.

8. The method of claim 1, wherein said first request signal includes the strings "cgi-bin" and "?".

9. The method of claim 1, wherein said banner location signal includes an HTTP 302 redirect signal.

10. The method of claim 9, wherein said first request signal includes the strings "cgi-bin" and "?".

11. The method of claim 1, wherein said second portion of information includes an advertisement.

12. The method of claim 1, wherein browser software is operating on said terminal and said browser software generates said first request signal and said second request signal.

13. The method of claim 1, wherein said reference to said second portion of information includes at least a portion of a URL.

14. The method of claim 1, wherein said location signal includes at least a portion of a URL.

15. The method of claim 1, wherein said intermediary device is a proxy server.

16. The method of claim 1, wherein said first portion of information is a world wide web page.

17. A method for distributing a banner over a computer network to a client device, wherein the banner is stored in one or more servers connected to the computer network and referenced in a hypertext document served to the client device, and for counting the number of times a banner is displayed on the client device, comprising:

sending a first banner request signal from the device to a server requesting that a banner be served to the client device, wherein said first banner request signal cannot be blocked from reaching said server by either the client device or any intermediary device located topologically between the client device and the server as a result of previous caching or storing of said banner by the client device or said intermediary device;

sending a banner location signal from said server to the client device, wherein said banner location signal includes location information for a specified banner to be displayed on the client device;

determining if said specified banner is stored on the client device and, if said specified banner is stored on the client device, displaying said specified banner on the client device, and if said specified banner is not stored on the client device, sending a second banner request signal from the client device requesting that said specified banner be served to the client device for display on the client device; and counting each display of said specified banner on the client device.

18. The method of claim 17, including storing said specified banner in the client device after said specified banner is served to the client device.

19. The method of claim 17, wherein said first banner request signal is a content general request signal.

20. The method of claim 19, wherein said second banner request signal is a content specific request signal.

21. The method of claim 17, wherein said first banner request signal includes the strings "cgi-bin" and "?".

22. The method of claim 17, wherein said banner location signal includes an HTTP 302 redirect signal.

23. The method of claim 13, wherein said banner includes an advertisement.

24. The method of claim 17, wherein said counting each display of said specified banner on the client device is done by said server.

25. The method of claim 24, wherein said counting each display of said specified banner on the client device is done by said server after said server receives said first banner request signal.

26. The method of claim 17, wherein browser software is operating on said client device and said browser software generates said first banner request signal and said second banner request signal.

27. The method of claim 17, wherein said banner location signal includes at least a portion of a URL.

28. The method of claim 17, wherein said first banner request signal includes at least a portion of a URL.

29. The method of claim 17, wherein said intermediary device is a proxy server.

30. A method for counting the number of times a banner is displayed on a device, wherein the banner is referenced in a document served to the device, the banner is stored in one or more servers connected to the computer network, and the device is connected to the computer network via an intermediary server, comprising:

sending a first banner request signal from the device to a first server requesting that a banner be served to the device, wherein said first banner request signal cannot be blocked from reaching said first server by either the device or the intermediary server as a result of previous caching or storing of said banner by the device or the intermediary server;

sending a banner location signal from said first server to the device, wherein said banner location signal includes location information for a specified banner stored on a second server;

determining if said specified banner is stored on the device and, if said specified banner is not stored on the device, then sending a second banner request signal from the device to the intermediary server and determining if said specified banner is stored on the intermediary server, wherein if said specified banner is not stored on the intermediary server, sending said second banner request signal from said intermediary server to said second server requesting that said second server serve said specified banner to the device;

displaying said specified banner on the device; and counting the number of times said specified banner is displayed on the device.

31. The method of claim 30, wherein said second server is said first server.

32. The method of claim 25, wherein said first banner request signal includes the strings "cgi-bin" and "?".

33. The method of claim 32, wherein said banner location signal includes an HTTP 302 redirect signal.

34. The method of claim 30, wherein said banner location signal includes an HTTP 302 redirect signal.

35. The method of claim 30, wherein said banner includes advertising information.

36. The method of claim 30, wherein said counting the number of times said specified banner is displayed on the device is performed by said first server.

37. The method of claim 36, wherein said counting the number of times said specified banner is displayed on the device is performed by said first server after said first server receives said first banner request signal sent by the device.

38. The method of claim 30, wherein the intermediary server is a proxy server.

39. A method for serving a banner to a client device, wherein a primary server serves a HTML document to the client device and the HTML document contains an initial URL associated or pointing to a banner to be served to the client device in order to complete rendering of the HTML document on the client device, comprising:

causing a first TCP/IP compliant request for the banner containing at least a portion of the initial URL, to be sent from the client device to the primary server without allowing said first TCP/IP compliant request to be blocked from being received by the primary server;

serving a signal from the primary server to the client device that includes a second URL associated with the banner's location;

determining if the banner is stored on the client device and, if the banner is stored on the client device, rendering the banner on the client device, and if the banner is not stored on the client device, causing a second TCP/IP compliant request to be sent from the client device requesting that the banner be served to the client device; and counting at least one rendering of the banner on the client device.

40. The method of claim 39, wherein said first TCP/IP compliant request includes the strings "cgi-bin" and "?".

41. The method of claim 39, wherein said signal sent from said primary server to said client device includes an HTTP 302 redirect command.

42. The method of claim 39, wherein said first TCP/IP compliant request cannot be blocked from being received by the primary server as a result of previous caching or storing of the banner by the client device or an intermediary device connected to the computer network.

43. The method of claim 42, wherein said intermediary device is located topologically on said computer network between the client device and the primary server.

44. A method for enabling accurate counting of the number of times a banner is displayed on a client device, wherein the banner is referenced in a document served to the client device, the banner is stored in one or more servers connected to the computer network, and the client device is connected to the computer network via an intermediary server, comprising:

causing a first banner request signal to be sent from the client device to a first server requesting that a banner be served to the client device, wherein said first banner request signal cannot be blocked from reaching said first server by either the client device or the intermediary server as a result of previous caching or storing of said banner by the client device or the intermediary server;

sending a banner location signal from said first server to the client device, wherein said banner location signal includes location information for a specified banner stored on a second server; and determining if said specified banner is stored on the client device and, if said specified banner is not stored on the client device, causing a second banner request signal to be sent from the client device to the intermediary server and determining if said specified banner is stored on the intermediary server, wherein if said specified banner is not stored on said intermediary server, causing a third banner request signal to be sent from the intermediary server to said second server requesting that said second server serve said specified banner to the client device.

45. The method of claim 44, wherein the intermediary server is a proxy server.

46. The method of claim 44, wherein said third banner request signal is identical to said second banner request signal.

47. The method of claim 44, including counting the number of times said specified banner is displayed on the client device.

48. The method of claim 44, wherein said first banner request signal includes the strings "cgi-bin" and "?".

49. The method of claim 44, wherein said first server and said second server are the same server.

* * * * *